(12) United States Patent
Leinung

(10) Patent No.: US 8,280,582 B2
(45) Date of Patent: Oct. 2, 2012

(54) APPARATUS AND METHOD FOR IDENTIFYING IN ADVANCE OVERRUN PHASES OF A VEHICLE

(75) Inventor: Andreas Leinung, Munich (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 164 days.

(21) Appl. No.: 12/687,631

(22) Filed: Jan. 14, 2010

(65) Prior Publication Data

US 2010/0179726 A1 Jul. 15, 2010

Related U.S. Application Data

(63) Continuation of application No. PCT/EP2008/005473, filed on Jul. 4, 2008.

(30) Foreign Application Priority Data

Jul. 16, 2007 (DE) .......................... 10 2007 032 969

(51) Int. Cl.
*G06F 7/00* (2006.01)

(52) U.S. Cl. ......... 701/36; 701/22; 180/65.21; 180/197; 180/69.285; 903/903; 903/946

(58) Field of Classification Search ................... 123/320, 123/325, 339.17, 339.21; 701/36, 38, 22, 701/79–80; 180/197, 65.21; 903/903
See application file for complete search history.

(56) References Cited

U.S. PATENT DOCUMENTS

| | | | | |
|---|---|---|---|---|
| 5,060,611 A | * | 10/1991 | Krampe et al. | 123/320 |
| 5,132,906 A | * | 7/1992 | Sol et al. | 701/80 |
| 5,832,400 A | | 11/1998 | Takahashi et al. | |
| 5,995,895 A | | 11/1999 | Watt et al. | |
| 7,134,980 B2 | * | 11/2006 | Kroppe | 475/86 |
| 7,165,399 B2 | * | 1/2007 | Stewart | 60/600 |
| 7,349,776 B2 | * | 3/2008 | Spillane et al. | 701/36 |
| 7,577,504 B2 | * | 8/2009 | Sawada et al. | 701/38 |
| 7,577,508 B2 | * | 8/2009 | Fitzgibbons | 701/70 |
| 7,591,135 B2 | * | 9/2009 | Stewart | 60/600 |
| 7,808,214 B2 | * | 10/2010 | Bartilson | 320/167 |
| 7,853,389 B2 | * | 12/2010 | Luehrsen et al. | 701/82 |
| 8,099,226 B2 | * | 1/2012 | Ahn | 701/103 |
| 8,160,781 B2 | * | 4/2012 | Naono et al. | 701/48 |

(Continued)

FOREIGN PATENT DOCUMENTS

DE 3744222 * 12/1987

(Continued)

OTHER PUBLICATIONS

Nonlinear Filter Evaluation for Estimating Vehicle Position and Velocity Using Satellites; Wilson, S.G.; Aerospace and Electronic Systems, IEEE Transactions on; vol. AES-9 , Issue: 1; Digital Object Identifier: 10.1109/TAES.1973.309703 Publication Year: 1973 , pp. 65-75.*

(Continued)

*Primary Examiner* — Cuong H Nguyen

(74) *Attorney, Agent, or Firm* — Crowell & Moring LLP

(57) ABSTRACT

A device is provided for identifying overrun phases of a vehicle in advance. The device includes at least one processing unit, which processes altitude position data of a route that is traveled by a vehicle or will be traveled by a vehicle and calculates a prediction of the probable occurrence of future overrun phases of the vehicle, taking into consideration the altitude position data.

29 Claims, 5 Drawing Sheets

U.S. PATENT DOCUMENTS

| | | | |
|---|---|---|---|
| 8,175,785 B2 * | 5/2012 | Turski et al. | 701/82 |
| 2003/0200016 A1 * | 10/2003 | Spillane et al. | 701/36 |
| 2004/0030471 A1 | 2/2004 | Faye | |
| 2005/0021205 A1 * | 1/2005 | Niwa et al. | 701/37 |
| 2008/0223637 A1 * | 9/2008 | Bartilson | 180/65.4 |
| 2009/0326748 A1 * | 12/2009 | Frese et al. | 701/22 |

FOREIGN PATENT DOCUMENTS

| | | | |
|---|---|---|---|
| DE | 3744222 A | * | 12/1987 |
| DE | PCT/DE88/00745 | * | 6/1989 |
| DE | 101 28 758 A1 | | 12/2002 |
| DE | 10 2005 045 891 B3 | | 2/2007 |
| EP | 0 829 389 A2 | | 3/1998 |
| EP | 1 211 121 A2 | | 8/2002 |
| EP | 1 777 135 A1 | | 4/2007 |
| GB | 0229951.9 | * | 12/2002 |
| JP | 2004-157295 | * | 5/2004 |
| WO | PCT/DE88/00745 | * | 6/1989 |

OTHER PUBLICATIONS

On-line Vehicle Motion Estimation from Visual Terrain Information Part II: Ground Velocity and Position Estimation; Bresler, Y. et al.; Aerospace and Electronic Systems, IEEE Transactions on; vol. AES-22 , Issue: 5; Digital Object Identifier: 10.1109/TAES.1986.310726; Publication Year: 1986 , pp. 588-604.*

A Solution to the Ill-Conditioned GPS Positioning Problem in an Urban Environment; Tsai-Hsin Chang et al.; Intelligent Transportation Systems, IEEE Transactions on; vol. 10 , Issue: 1; Digital Object Identifier: 10.1109/TITS.2008.2011709 Publication Year: 2009 , pp. 135-145.*

Nonlinear Filter Evaluation for Estimating Vehicle Position and Velocity Using Satellites; Wilson, S.G.; Aerospace and Electronic Systems, IEEE Transactions on; Volume: AES-9 , Issue: 1; Digital Object Identifier: 10.1109/TAES.1973.309703 Publication Year: 1973 , pp. 65-75.*

On-line Vehicle Motion Estimation from Visual Terrain Information Part II: Ground Velocity and Position Estimation; Bresler, Y. et al.; Aerospace and Electronic Systems, IEEE Transactions on; Volume: AES-22 , Issue: 5; Digital Object Identifier: 10.1109/TAES.1986.310726; Publication Year: 1986 , Page(s): 588-604.*

Preliminary Design, Simulation and Modeling of a Series Hybrid Commuter Vehicle with a Minimal IC Engine; Liqin Ni; Patterson, D.; Hudgins, J.L.; Vehicle Power and Propulsion Conference, 2007. VPPC 2007. IEEE; Digital Object Identifier: 10.1109/VPPC.2007.4544224; Publication Year: 2007 , pp. 754-758.*

German Office Action dated Dec. 11, 2007 w/English translation (Eight (8)) pages).

International Search Report dated Dec. 10, 2008 w/English translation (six (6) pages).

* cited by examiner

APPARATUS AND METHOD FOR IDENTIFYING IN ADVANCE OVERRUN PHASES OF A VEHICLE

CROSS-REFERENCE TO RELATED APPLICATIONS

This application is a continuation of PCT International Application No. PCT/EP2008/005473, filed Jul. 4, 2008, which claims priority under 35 U.S.C. §119 from German Patent Application No. DE 10 2007 032 969.7, filed Jul. 16, 2007, the entire disclosures of which are herein expressly incorporated by reference.

This application contains subject matter related to U.S. application Ser. No. 12/687,452, entitled "Method and Device for Determining Overrun Conditions of a Vehicle," and to U.S. application Ser. No. 12/687,428, now U.S. Pat. No. 7,908,055, entitled "Control Device for a Compressed Air System of a Vehicle," both filed on even date herewith.

BACKGROUND AND SUMMARY OF THE INVENTION

The invention relates to the field of the manufacture and the method of operation of vehicles and vehicle components. In particular, the invention relates to land vehicles for daily road traffic, in particular motor vehicles, such as, for example, commercial or utility vehicles. The terms commercial or utility vehicles are used interchangeably herein.

Vehicles in daily road traffic frequently travel temporarily in overrun conditions depending on the instantaneous speed, acceleration of the vehicle (positive or else negative, for example in the case of braking) or other external influences, such as interventions by the driver.

"Overrun conditions" herein refer to or mean the drag mode of the engine as a result of the kinetic energy of the vehicle which is fed in via the closed drivetrain. The vehicle, which at the time of an overrun condition has more kinetic energy than the engine is making available at that moment, drags the engine, i.e. attempts to accelerate it.

On a flat roadway, what are understood to be overrun conditions are possible only if the driver brakes the vehicle by taking his foot off the gas pedal. On a negative gradient, however, overrun conditions can occur for a relative long time either with a positive or negative vehicle acceleration or with a constant velocity depending on their degree and the driver's reaction at the gas pedal.

Overrun condition phases only make up a relatively small proportion of the entire travel time. In particular, it has not been previously possible to predict when overrun conditions will occur in a vehicle since the behavior of the driver has a significant influence on this. However, the driving behavior of the driver is not predictable, for which reason there is conventionally no possible way of predicting any possible overrun condition phases before they actually occur. The uncertainty in terms of the future or imminent driving behavior of the driver and therefore his vehicle prevents overrun condition phases which occur from being utilized in a technically efficient manner. Vehicle components can be controlled in a changed way only in the case of an overrun condition phase which has already commenced and is still continuing. However, conventionally, there is also uncertainty here about the duration for which an overrun condition phase, which has already commenced, will still continue since, apart from the driver's reaction, the future operating states of the vehicle, which are partially conditioned by the section of road, are unknown. This limits the possibilities of optimized control of vehicle components. Owing to the many unpredictable influences, there is not yet any way of overcoming the above-mentioned limitations with respect to the control and method of operation of vehicle components.

The object of the present invention is to make possible the advance identification of overrun condition phases in vehicles, in particular of land vehicles such as, for example, road vehicles.

The object is achieved by the present invention, which makes it possible for the first time to utilize cartographic altitude positions of a section of road, i.e. its local altitude coordinates (in the perpendicular direction with respect to the surface of the earth) technically in order to predict the occurrence of overrun condition phases of a mobile vehicle. Hitherto, navigations systems in mobile vehicles were used only to provide the driver with orientation in the two-dimensional road network and to calculate the shortest or the fastest route for the purpose of route planning. Altitude coordinates do not play a role in such navigation since the vehicle is tied to the respective road and must necessarily follow its altitude profile; only the horizontal coordinates parallel to the surface of the earth (in the positive y/x directions and in the North/South/East/West directions) are significant for the instantaneous position of the vehicle in the road network and for the resulting shortest route (the profile of which is correspondingly also represented only two-dimensionally). Conventionally, altitude coordinates are also not utilized in a technical manner to control a component of a vehicle, but rather exclusively for finding the route to a destination.

On the other hand, the invention permits an optimization of the operational sequence or of the control processes of the vehicle, in particular of a component of the vehicle, as a function of segments of a road section lying ahead of the vehicle, which segments have negative gradients. Conventionally, only the parameters of the actual vehicle which indicate the respective operating states of the vehicle components are used as influencing variables for controlling and optimizing them but not the cartographic data of a section of road being traveled on. The invention permits vertical position coordinates of the section of road and/or of the vehicle to be included in order to calculate in advance the future driving behavior of the vehicle and, in particular, calculate a prediction about overrun condition phases which are expected to occur. On the basis of said overrun condition phases it is possible to improve the control of one or more vehicle components.

It is therefore possible, for example, to identify in advance whether and when an overrun condition phase which continues for a relatively long time is imminent, during which phase a control process, switching process or other working step of a vehicle component can be carried out without consuming energy or with relatively low consumption of energy. While the imminent driving behavior of the driver is conventionally considered to be unpredictable, the present invention permits a qualitative technological advance in terms of the control and method of operation of vehicle components taking into account influencing variables which lie outside the vehicle itself. Any desired vehicle components, in particular components of road-bound vehicles, for example of commercial or utility vehicles, can benefit from this.

In particular, it becomes possible to identify overrun conditions or overrun condition phases in advance and to utilize them technically in the vehicle. In particular, phases in which the vehicle engine of the traveling vehicle receives, via its connection to the vehicle wheels, an additional torque which has the effect of increasing the engine speed can be utilized for energy-saving or energy-free execution of a control process, switching process or other working step of any desired vehicle component.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
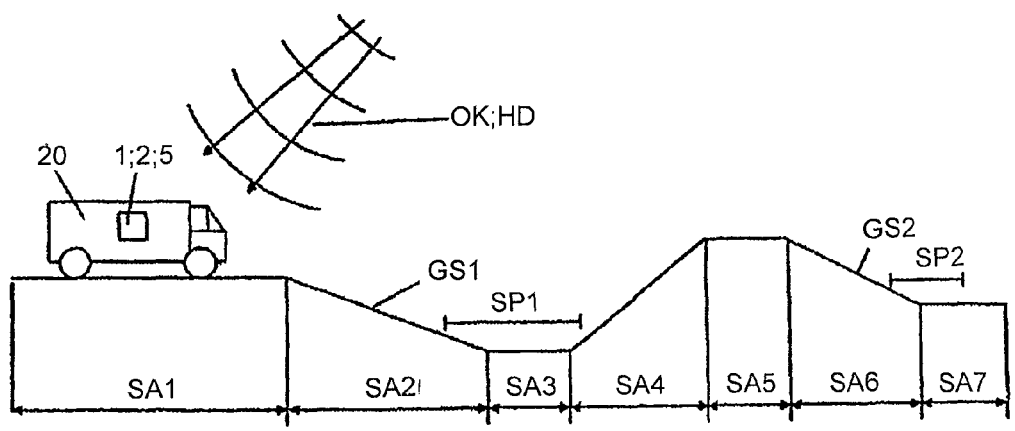
FIG. 1 is a schematic illustration of a vehicle having the device according to the invention.

FIG. 1 is a schematic view of a vehicle 20, which is equipped with a device 1, on a section of road F. The device 1 is constructed in such a way that it can receive altitude position data (HD) and preferably also instantaneous location coordinates OK; x, y, L of the traveling vehicle and process them to form a prediction about the occurrence and/or the chronological duration of overrun condition phases in the future. Conventionally, at most the geographic location coordinates OK which indicate the instantaneous position x; y of the vehicle are evaluated for the purpose of orientation in road traffic, especially since the vehicle must inevitably follow the altitude profile of the road, and therefore no possibilities of influencing the selectable routes of the road network arise from the altitude position data.

However, the altitude position data are principally processed to form a prediction for overrun condition phases which cannot conventionally be identified in advance. FIG. 1 is a schematic view of section-of-road segments GS1, GS2 having a negative gradient which lie ahead of the vehicle on the section of road. According to the invention, a prediction of future and/or instantaneous, still continuing overrun condition phases is calculated. These overrun condition phases will generally coincide spatially and chronologically only to a certain degree with the segments of the section of road with a negative gradient since usually further vehicle parameters or their instantaneous values also exert an influence on the operating states of the vehicle and its vehicle components during travel.

In FIG. 1, the road section is divided in a simplified fashion into a plurality of segments SAn. In addition, FIG. 1 illustrates by way of example two future overrun condition phases SP1, SP2, with the first overrun condition phase SP1 even overlapping spatially with a part SA4 of the section of road which has a positive gradient in the direction of travel that tends to counteract overrun conditions. The first overrun condition phase SP1 overlaps simultaneously with segments of the section of road which coincide in the direction of travel with a positive gradient (for SA4), with segments of the section of road which coincide with a section of road with a negative gradient (for SA2) and with a segment of the section of road which coincide with a horizontal section of road profile without a negative gradient or a rise in altitude (for SA3). The prediction, which is calculated by the device according to the invention, therefore generally does not equate the sections of road with a negative gradient only with overrun condition phases, but also takes into account in the calculation and prediction of the overrun condition phases a relatively complex dependence between the two, with further vehicle parameters usually also being included in the calculation.

Any desired vehicle component FK of the vehicle 20 can be controlled by way of the device 1, which has a processing unit 2 and/or a control unit 5 (which may be separate or integrated into the device or the processing unit thereof or into another component of the device). The terms processing unit and control unit are generally used interchangeable herein in that they may perform the calculations and controls described herein.

Figure 2:
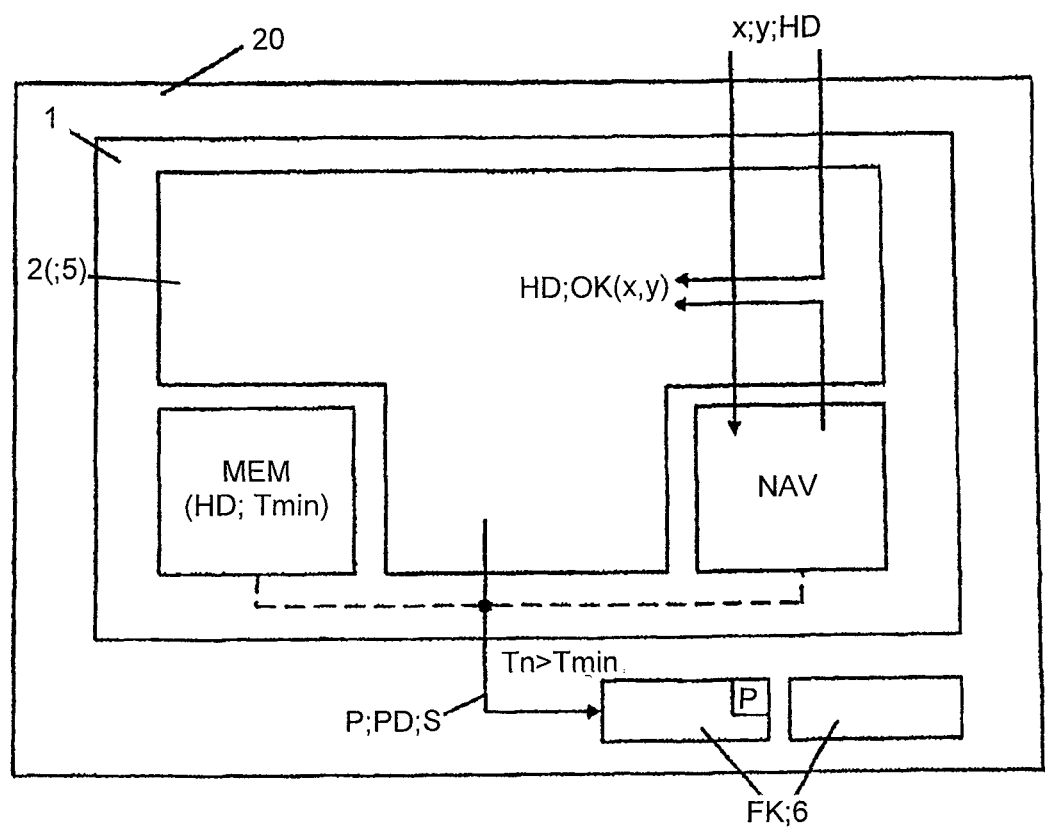
FIG. 2 is a schematic illustration of a first embodiment of the device according to the invention.

FIG. 2 is a schematic view of an embodiment of the inventive device 1 of the vehicle 20 or for a vehicle 20 (i.e. before installation in the vehicle). The device 1 includes a processing unit 2, which processes the altitude position data HD of a section of road F which is to be traveled along. This processing is used to calculate a prediction P about principally future overrun condition phases SPn, in which case the prediction is output in the form of prediction data PD and/or control signals S. The prediction data PD and/or control signals S can be transmitted for example from the processing unit 2 to at least one vehicle component FK which is to be controlled. In said component FK or in the actual device according to the invention, it is also possible to store vehicle parameters P which are also taken into account in the control process.

In addition, the device 1 may include a navigation system NAV, which is used to receive the altitude position data HD and preferably also the location coordinates OK; x, y; L of the vehicle 20 (in particular, when it is already traveling). In this way, it is possible for the prediction as to which overrun condition phases are expected to occur to be calculated and to be identified in advance before or during travel and to be included in the control of vehicle components FK in advance.

The device 1 may also include a memory device MEM, which is used to store, for example, the altitude position data HD or vehicle parameters p. In addition, the instantaneous location coordinates OK of the traveling vehicle can also be stored in the memory device MEM during travel. A limiting value Tmin for the minimum chronological duration of overrun condition phases, above which technical utilization of the respective overrun condition phases are intended to first take place, can also be stored in the memory device MEM. The units MEM and/or NAV can also be integrated into the processing unit 2 or embodied as separate units outside the device 1.

Figure 3:
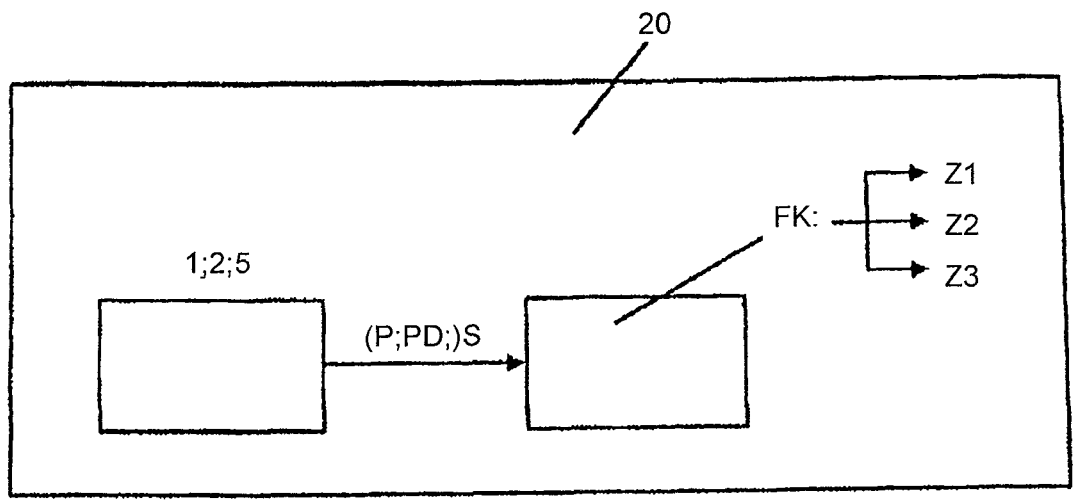
FIG. 3 shows the control of any desired vehicle component of the vehicle by means of the device according to the invention.

FIG. 3 is a schematic view of the control of any desired vehicle component FK of the vehicle 20, which is made possible by the device 1 and is carried out taking into account altitude position data. As a result of the prediction, control signals S are transmitted to the vehicle component FK or to the control device thereof, in order to control the vehicle component taking into account predicted overrun condition phases. Future overrun condition phases (or future parts of an overrun condition phase, which is still continuing at that instant) are not taken into account in the control process. As a result of the optimized control process, it is possible, for example, to make a decision as to whether and when a vehicle component is operated in a first operating state Z1, in a second operating state Z2, or in another further state Zn, taking into account future overrun condition phases. The control of the vehicle components can therefore be improved. Therefore, it is possible, for example when the chronological duration of a future overrun condition phase is expected to exceed an envisaged minimum duration Train, to operate the vehicle component in the state Z1 during this overrun condition phase or temporarily during this overrun condition phase and otherwise operate it in other states. In addition, the vehicle component can be controlled, in various ways, in particular in terms of the method and functioning of the respective states and the decision as to which state is to be assumed at what time. The vehicle components can be, for example, a compressed air system, a brake system, a dynamo, or any other desired component of a vehicle, in particular of a commercial or utility vehicle.

Figure 4A:
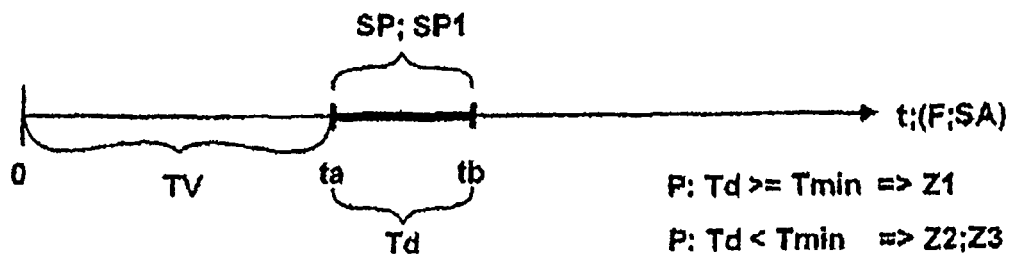
FIGS. 4A to 4C show a plurality of different embodiments relating to the chronological calculation in advance of overrun condition phases.
Figure 4B:
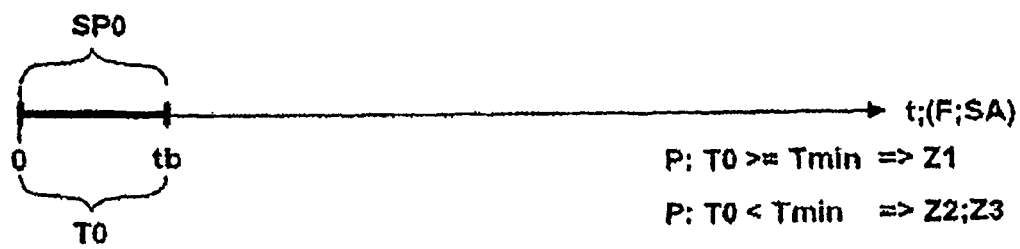
Figure 4C:
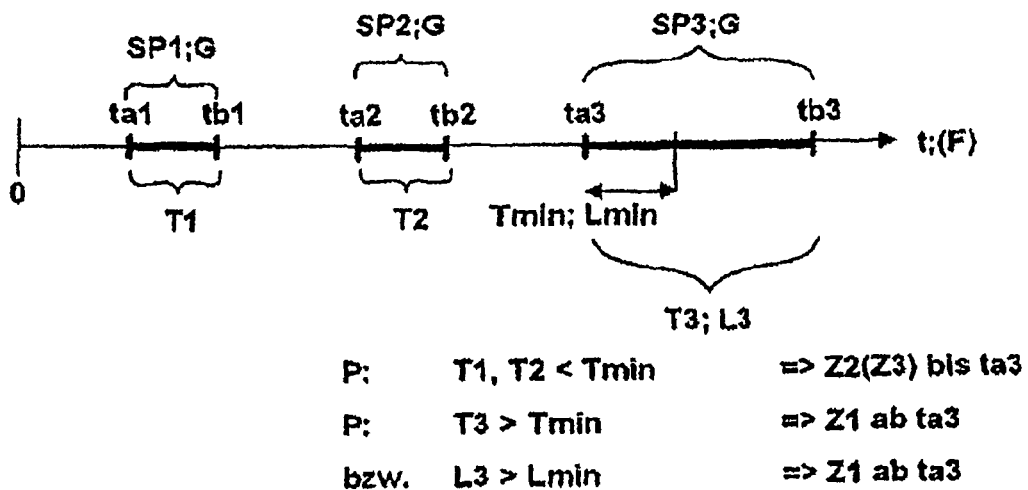

FIGS. 4A to 4C show by way of example a number of embodiments (which can also be combined with one another) of the invention relating to the chronological calculation of overrun condition phases in advance. In each case a time line, starting with the present time t=0 and for a future time period t>0 is represented. This time period can constitute a time period which is provided for traveling along a section of road F which is to be traveled along or is envisaged or a segment SA of a section of road lying ahead, and corresponds at the same time to the travel coordinate (for example, the expected km reading) of the vehicle along the section of road F or of the respective next segment SA of the section of road lying ahead.

According to FIG. 4A, an overrun condition phase SP or a first, imminent overrun condition phase SP1 is calculated in advance for this or for a directly imminent time period (of the order of magnitude of, for example, several seconds up to a number of minutes). In this context it is possible, for example, to determine a section of road with a negative gradient by use of the altitude coordinates of the section of road. However, the chronological or spatial start of the overrun condition phase does not have to correspond to the start and end of the section of road with a negative gradient, but rather can deviate from the section of road with a negative gradient owing, for example, to initial parameter values of the vehicle when the section of road with a negative gradient is reached and the further effect thereof.

In FIG. 4A, after a time period TV, the occurrence of the overrun condition phase SP or SP1 is calculated in advance, with an expected starting time ta and finishing time tb and a time period Td. This prediction P permits technical utilization of the overrun condition phase. In addition, it is possible to check whether the expected duration Td of the overrun condition phase exceeds a predefined minimum duration Tmin. In addition, the control (of any desired vehicle component) can be carried out such that the overrun condition phase is also actually technically utilized, on the condition that the duration Td of the overrun condition phase is longer than the minimum duration Tmin (instead of, at any rate, independently of the duration Td of said overrun condition phase).

An overrun condition phase can be utilized, for example, by virtue of the fact that a vehicle component or any other desired device on or in the vehicle is switched from a first state Z1, which is present, for example, chronologically outside overrun condition phases, into a second state Z2 or into further states Z3. This switching to Z2 or Z3 can also take place or be provided for just part of the duration Td of the overrun condition phase SP (instead of continuously during the entire time period Td). In particular, a technical process (even a relatively short time period) can be chronologically synchronized in such a way that it is carried out within the time period between ta and tb.

Likewise, further subsequent overrun condition phases can already be calculated in advance; in FIG. 4A, just a single subsequent overrun condition phase which is calculated in advance is represented for the sake of simplicity.

As is illustrated in FIG. 4B, it is also possible to calculate, for an overrun condition phase which has already started and which is still continuing at the particular instant, i.e. at the time t=0, a prediction for the still remaining duration T0 of this overrun condition phase or the finishing time tb thereof. Technical utilization of the overrun condition phase (for example, by switching a component into a state other than Z1) can be brought about, for example, or preferably brought about, when the predicted further duration T0 is expected to exceed a minimum duration Tmin. A combined prediction for overrun condition phases which are continuing at present and overrun condition phases in the future can also be generated according to FIGS. 4A and 4B.

According to FIG. 4C, for instantaneous and/or future overrun condition phases SP1, SP2 whose chronological duration T1, T2 is respectively expected to be smaller than a predefined chronological minimum duration Tmin and which precede a calculated, earliest future overrun condition phase SP3 with a longer duration T3 than Tmin, it is possible to prevent the technical utilization of the preceding overrun condition phases SP1, SP2. In this context, the recognition, which is acquired by way of the prediction, that an overrun condition phase SP3 which will still continue for a relatively long time and which permits even more efficient or more energy-saving technical utilization than the preceding overrun condition phases SP1, SP2 with a relatively short duration, is to be expected. The technical utilization of a respective overrun condition phase can take the form, for example, of obtaining energy and/or storing energy in or for any desired vehicle component. The chronological duration of an overrun condition phase can also be expressed in the form of a part of a section of road which is expected to be passed through in overrun conditions, for example for the overrun condition phase SP3 in, for example, the form of a length Lmin of the section of road (which is longer for this overrun condition phase SP3 than a predefined minimum length Lmin of a section of road). The technical utilization can in turn occur, for example, in the form of switching of a component into another state, for example (conversely to that explained by means of FIGS. 4A and 4B) to Z1 (instead otherwise Z2 or Z3), or vice versa.

Of course, the technical utilization of an overrun condition phase can (and generally does) take place taking into account further vehicle parameters or component parameters. The chronological sequence and duration for the overrun condition phases which are calculated in advance and also those overrun condition phases which are not identified in advance, but rather are also actually utilized technically, therefore generally constitutes not only a mapping of the altitude profile of the section of road which is being traveled along or is to be traveled along but also results from a relatively complex dependence on a multiplicity of influencing variables, the altitude profile of the section of road constituting one of these influencing variables.

Figure 5:
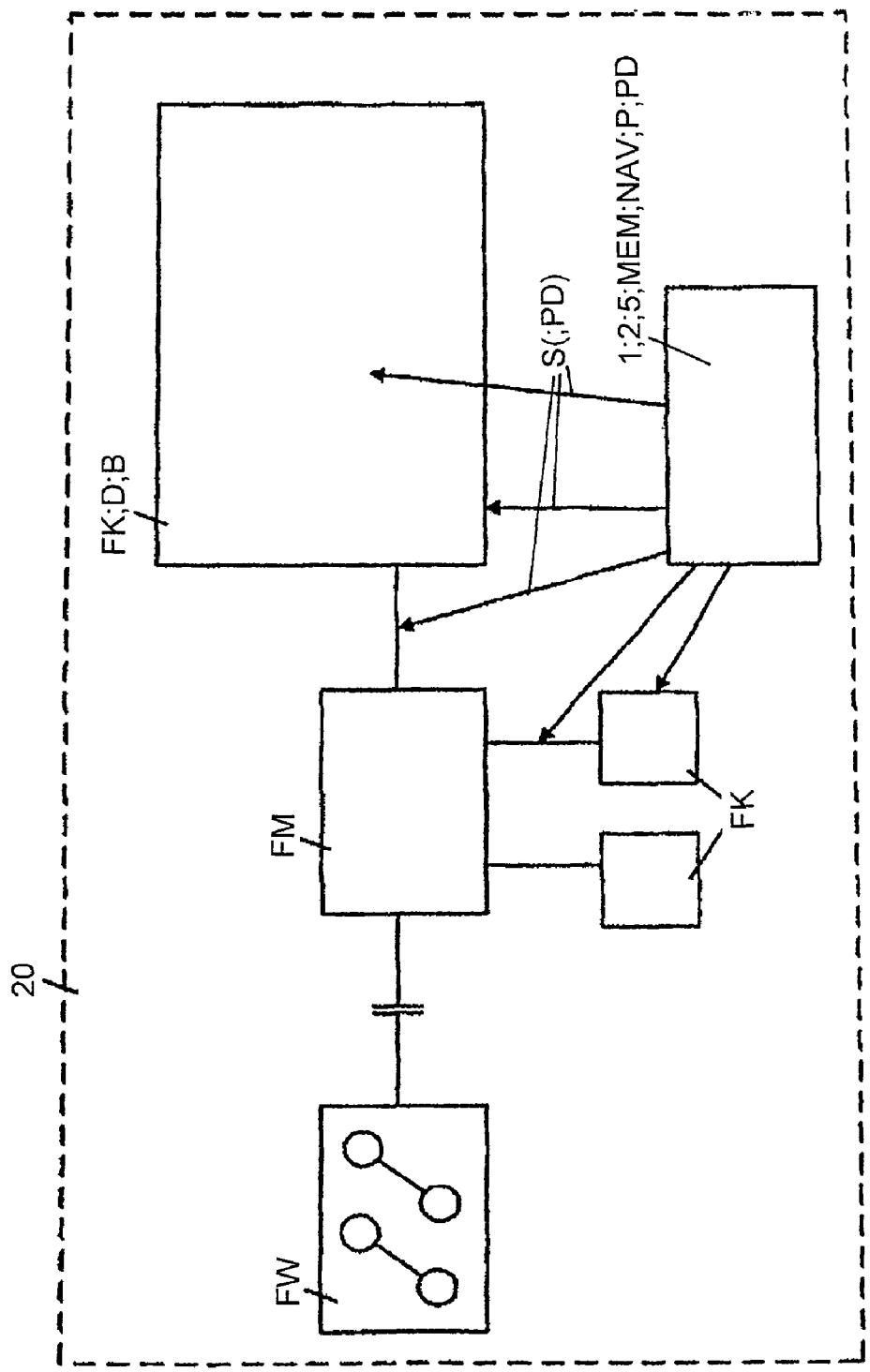
FIG. 5 is a schematic illustration of a number of components of a vehicle having the device according to the invention according to one possible embodiment.

FIG. 5 is a schematic view of a number of components on a vehicle with the device 1 according to a possible embodiment. The component which is controlled taking into account overrun condition phases can, in particular, be a compressed air system D, for example a brake system B. It is additionally also possible to control further vehicle components FK by way of the device 1. The device 1 is illustrated outside the vehicle components FK in FIG. 5, but can also be integrated completely or partially into these components FK. It is also possible to embody them as a separate delivery part with which the vehicle or one of its components (for example the compressed air system or a part of the compressed air system) can be retrofitted. In this respect, the position of the device 1 in FIG. 5 represents merely one of a large number of possible embodiments. The device 1 can include the units 2, 5, MEM and/or NAV described above; individual components or some of these components can, however, also be arranged in the vehicle component FK which is to be actuated in an improved fashion or in the surroundings thereof. Depending on the embodiment, it is possible to actuate just a single component FK or else a plurality of components FK by way of the device 1, as indicated in FIG. 5 by means of the arrows. The respective components FK, in particular the compressed air system D or the brake system B, can be constructed internally in any desired manner. Each component can be connected directly or indirectly to a vehicle engine FM. The vehicle engine FM can be connected via a clutch to the running gear FW, in particular to the driven wheels.

Table of Reference Numerals:

| | |
|---|---|
| 1 | Device |
| 2 | Processing unit |
| 5 | Control unit |
| 20 | Vehicle |
| B | Brake system |
| D | Compressed air system |
| F | Section of road |
| FK | Vehicle component |
| FW | Chassis |
| G | Negative gradient |
| GS | Segment or part of section of road with a negative gradient |
| HD | Altitude position data |
| L | Length |
| LM | Dynamo |
| Lmin | Minimum length |
| MEM | Memory unit |
| NAV | Navigation system |
| OK | Location coordinates |
| P | Prediction |
| PD | Prediction data |
| P | Vehicle parameter |
| R | Direction of travel |
| S | Control signal |
| SA | Segment or part of section of road |
| SP; SPn | Overrun condition phase |
| SP0 | Instantaneous overrun condition phase |
| ta | Time of start of an overrun condition phase |
| tb | Time of end of an overrun condition phase |
| Td; Tn | Chronological duration of an overrun condition phase |
| Tmin | minimum duration |
| TV | Time interval to overrun condition phase |
| T0 | Remaining duration of an instantaneous overrun condition phase |
| x; y | Geographic position |
| z | Vertical position |
| Z1 | First state |
| Z2 | Second state |
| Zn | Further state |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for identifying overrun condition phases of a vehicle, the apparatus comprising:
a processing unit operatively configured to receive and process altitude position data of a section of road that is being traveled on or is to be traveled on by the vehicle, said processing unit calculating a prediction about a probable occurrence of future overrun condition phases of the vehicle taking into account the received altitude position data,
wherein the processing unit is operatively configured to compare the duration of overrun condition phases that are expected to occur with a predefined minimum duration, and calculate a prediction that brings about a selective utilization exclusively of those overrun condition phases already started or imminent and for whose calculated duration is longer than the predefined minimum duration.

2. The apparatus according to claim 1, wherein the processing unit calculates a prediction indicating, in each case, an occurrence of probable future overrun condition phases along a segment of the road section lying ahead of the vehicle.

3. The apparatus according to claim 1, wherein the processing unit calculates in advance the prediction for, in each case, one segment of the road section having a predefined length, said segment of the road section lying directly ahead of the vehicle during a journey along the road section.

4. The apparatus according to claim 1, wherein the processing unit calculates a prediction indicating whether and where overrun condition phases occur on a road section or segment of a road section lying ahead of the vehicle.

5. The apparatus according to claim 1, wherein the prediction comprises indications about at least one of:
a start time, an end time, and a chronological duration of one or more overrun condition phases expected to be imminent.

6. The apparatus according to claim 1, wherein the processing unit is operatively configured to calculate, from the received altitude position data and from a travel direction of the vehicle along the road section, where negative gradients will occur in the travel direction on the road section or on a segment lying directly ahead of the vehicle of the road section.

7. The apparatus according to claim 1, wherein the technical utilization of overrun condition phases is carried out such that during each technically utilized overrun condition phase, energy is at least briefly acquired from said overrun condition and/or stored in at least one vehicle component, or energy consumption of the at least one vehicle component is temporarily reduced during the overrun condition.

8. The apparatus according to claim 1, further comprising a memory that stores, as the predefined minimum duration for overrun condition phases to be utilized technically, a fixed limiting value or a limiting value dependent on vehicle parameters.

9. The apparatus according to claim 1, wherein the processing unit is operatively configured to compare a length of road sections having a negative gradient lying ahead with a predefined minimum length, and output prediction data permitting targeted utilization of overrun condition phases on only said road sections having the negative gradient and a length exceeding the predefined minimum length.

10. The apparatus according to claim 1, wherein the processing unit calculates, for an instantaneous overrun condition phase, a prediction about an expected remaining chronological duration of the instantaneous overrun condition phase.

11. The apparatus according to claim 10, wherein the processing unit generates a control signal for the instantaneous overrun condition phase, said control signal defining, as a function of the expected remaining chronological duration, whether or not technical utilization of the instantaneous overrun condition phase is to be used for at least one vehicle component.

12. The apparatus according to claim 11, wherein the processing unit generates a second control signal for an instantaneous overrun condition phase that has already occurred, said second control signal causing a technical utilization of the instantaneous overrun condition phase in at least one vehicle component when the expected remaining chronological duration exceeds a predefined limiting value.

13. The device according to claim 1, wherein the processing unit calculates a prediction about expected chronological durations of one or more overrun condition phases that are to occur in the future.

14. The apparatus according to claim 13, wherein the processing unit generates a control signal for one or more of the future overrun condition phases, said control signal as a function of the expected chronological duration of the overrun condition phases, defining in each case whether or not technical utilization of a respective overrun condition phase is to be used in at least one vehicle component.

15. The apparatus according to claim 14, wherein the processing unit generates in each case for the future overrun condition phases identified in advance, a control signal which, if the expected chronological duration exceeds a predefined limiting value, causes a technical utilization of the overrun condition phase in the at least one vehicle component.

16. The apparatus according to claim 1, wherein the processing unit calculates a chronological interval up to a start of an earliest future overrun condition phase having a duration expected to exceed a predefined minimum duration.

17. The apparatus according to claim 16, wherein, for at least one of instantaneous and future overrun condition phases having a chronological duration expected in each case to be shorter than the predefined minimum duration and which precede the calculated earliest future overrun condition phase having a longer duration than the predefined minimum duration, the processing unit prevents the technical utilization of such preceding overrun condition phases for vehicle components.

18. The apparatus according to claim 1, further comprising at least one vehicle component, said at least one vehicle component being controlled via the processing unit.

19. The apparatus according to claim 1, wherein, in order to calculate overrun condition phases in advance, the processing unit further calculates a prediction about an expected occurrence of future overrun condition phases of the vehicle as a function of location coordinates indicating a geographic location of the vehicle along the road section.

20. The apparatus according to claim 19, wherein the processing unit, for calculating the overrun condition phase in advance, continues processing current vehicle parameters, said current vehicle parameters comprising at least one of:
said altitude position data, said location coordinates, vehicle speed, wheel speeds, yaw rates, vehicle acceleration, a compressed air level of a vehicle brake system, a humidity level of a compressed air vessel or compressed air-treatment cartridge, an engine speed, an absolute value and/or sign of an engine torque, clutch data, gear speed date, vehicle retarder data, and an inter vehicle distance.

21. The apparatus according to claim 19, wherein said location coordinates indicate an instantaneous position of the vehicle traveling along the road section.

22. The apparatus according to claim 21, further comprising a navigation device operatively configured to receive the location coordinates, said navigation device transmitting said location coordinates to said processing unit.

23. The apparatus according to claim 22, further comprising a memory unit in which said altitude position data of the road section is stored.

24. The apparatus according to claim 22, wherein said navigation device also receives said altitude position data of the road section and transmits said altitude position data to said processing unit.

25. The apparatus according to claim 24, wherein said altitude position data comprise vertical position coordinates of points on the road section or segments of the road section.

26. The apparatus according to claim 18, further comprising a control unit operatively coupled to said processing unit, said control unit controlling the at least one vehicle component.

27. The apparatus according to claim 1, wherein said processing unit is operatively configured to output control signals based on said calculated prediction, said control signals being at least one of electrical, pneumatic, and optical control signals.

28. The apparatus according to claim 1, wherein said processing unit performs one of open-loop and closed-loop control of air pressure of a compressed air system of the vehicle, said compressed air system being coupled to said processing unit.

29. The apparatus according to claim 7, wherein the at least one vehicle component is one of:
a compressed air system component, a brake system component, a dynamo, and a generator.

* * * * *